US005448734A

United States Patent [19]
Hrabik et al.

[11] Patent Number: 5,448,734
[45] Date of Patent: Sep. 5, 1995

[54] SELECTIVE DISTRIBUTION OF MESSAGES USING NAMED PIPES

[75] Inventors: Richard J. Hrabik, Leander, Tex.; Christopher J. Lennon, Cary, N.C.; Timothy N. Scaggs, Durham, N.C.; Philip A. Smith, Raleigh, N.C.

[73] Assignee: International Business Machines Corporation, Armonk, N.Y.

[21] Appl. No.: 249,675

[22] Filed: May 26, 1994

Related U.S. Application Data

[63] Continuation of Ser. No. 767,595, Sep. 30, 1991, abandoned.

[51] Int. Cl.⁶ ............... G06F 15/16; G06F 13/364; G06F 13/00
[52] U.S. Cl. .................... 395/650; 364/927.94; 364/281.7; 364/284.3
[58] Field of Search ..................... 395/650, 700

[56] References Cited

U.S. PATENT DOCUMENTS

| | | | |
|---|---|---|---|
| 4,470,115 | 9/1984 | Wehr | 395/250 |
| 4,825,354 | 4/1989 | Agrawal et al. | 364/200 |
| 5,165,024 | 11/1992 | Sweazey | 395/325 |

OTHER PUBLICATIONS

H. M. Deitel, Operating Systems, pp. 582, 583.
H. M. Deitel, Operating Systems, 1990, pp. 584–586.
"Operating Systems" by H. M. Deitel, pp. 51–57, 1990.
"Experience with Minix in an Operating System Lab" by Harley, S. J, SIGCSE Bulletin, Sep. 1990.
"Interprocess Communication in the Eight Edition Unix System" by Presotlo et al, USENIX Association, Jun. 1985.
"Interprocess Communication in the Ninth Edition Unix System" by Presotlo et al, Software Practice & Experience, Jun. 20, 1990.
"OS/2 LANs #2" by Brenner, Aaron, LAN Magazine, Oct. 1989.

Primary Examiner—Kevin A. Kriess
Assistant Examiner—Michael T. Richey
Attorney, Agent, or Firm—John D. Flynn; Jerry W. Herndon

[57] ABSTRACT

Method and apparatus in a computer system for communicating messages between message sending and message receiving processes, without the need of providing a system registry of receiving processes and message types. A process wishing to receive messages of type X creates a named pipe having name X. A process wishing to send a message of type X to other interested processes in the system opens every instance of the name pipe X and writes the message to each instance. The system automatically alerts the receiving process on the other end of a pipe instance and, in response, the receiving process reads the message from the named pipe.

21 Claims, 6 Drawing Sheets

SELECTIVE DISTRIBUTION OF MESSAGES USING NAMED PIPES

This application is a continuation of U.S. Ser. No. 07/767,595 filed 30 Sep. 1991, abandoned entitled "SELECTIVE DISTRIBUTION OF MESSAGES USING NAMED PIPES", assigned to the same assignee as this patent application.

TECHNICAL FIELD

The invention generally relates to interprocess communication in a multitasking or multiprocessing computer system. In particular, it relates to a method and apparatus for the selective distribution of messages by processes within the system via named pipes to other message receiving processes, all according to message types and without using table registration of the receiving processes.

BACKGROUND OF THE INVENTION

The present methods for interprocess communication (IPC) in computer systems include the use of shared memory, semaphores, queues, pipes and named pipes, to name most of the primary methods. The characteristics of these various methods of IPC are summarized in an article, TALKING TASKS, which appears in the November 1990 issue of BYTE magazine, beginning at page 403.

This disclosure is concerned with the use of named communication channels or named pipes. One scenario involving the use of named pipes for interprocess communication is message distribution. In some systems, for example, a message server receives message from other processes running in the system and distributes the messages to still other processes that wish to receive the messages. This technique is commonly used in windowed operating systems, such as the OS/2 (trademark of IBM, Inc.) operating system for-desktop computers. One standard technique of using named pipes in such an operating system is for the message server to distribute a message to every process that may wish it and let each receiving process decide if the message contains information of interest to it. This is called the broadcast technique. A second standard technique is to maintain a registry of processes and the specific type of message each of the registered processes wish to receive. This may be referred to as the registry approach. Clearly, the broadcasting technique creates a large amount of wasted traffic within a computer. Examples of the latter registry approach are described in another article, INTERPROCESS COMMUNICATION IN THE NINTH EDITION UNIX SYSTEM, which is published in Software-Practice and Experience, Vol. 20(S1), pages S1/3-S1/17, June 1990, by David Presotto and Dennis Ritchie. For example, a connection server, which uses a registry approach, is described beginning at page S1/10 of the article. In this example, a server process creates a pipe and advertises its services and its pipe to other processes. When a client process wishes to avail itself of a service, it connects to the pipe and transmits to the server some identification for registration, plus an identification of the type of service that is desired. This type of service might be a request to receive certain types of system messages.

A variation on the registry method is described in the article PORTABLE IPC ON VANILLA UNIX, Mark Rain, Penobscot Research Center, Deer Isle, Me. 04627. This paper describes a channel server whose service is to handout IPC channels and to act as a server registry for client processes. A server acquires and IPC channel (pipe) from the channel service. Then it registers itself with the channel service, together with an indication of the service it offers.

The various registry approaches can be awkward to maintain for certain purposes. For example, if a registered process terminates abnormally, the registration with the server process that maintains the registry is not automatically removed without special arrangements to trap this condition. Moreover, the broadcast and registry techniques consume substantial resources, which it would be desirable to reduce.

SUMMARY OF THE INVENTION

The invention is a method and apparatus in a computer system for communicating messages between message sending and message receiving processes. A process wishing to receive messages of a certain type creates a communication channel, such as a named pipe. The pipe terminates at one end on the receiving process and it is administered by the computer operating system. A name by which processes may address the channel is assigned in correspondence with the message type desired to be received by the creating process. In other words, a message type identification also identifies a channel name. A process wishing to send a message of a selected type to another interested process in the system opens a communication channel having a name corresponding to the selected message type. The sending process then writes the message to the channel using a system function call provided for that purpose. The process of writing to the channel via the system function call causes the receiving process on the other end of the channel to be alerted and, in response, the receiving process reads the message from the channel.

In a preferred embodiment, after the receiving process creates the communication channel, the receiving process is placed into an inactive state until it is reactivated by the system as a result of the writing of a message to the channel by a sending process. After the message is read from the channel by the receiving process, it again resumes an inactive state until another process writes to the channel. However, the receiving process may remain active if it wishes and determine when a message is present on the pipe by the use of semaphores sent by the operating system.

In system of the type in which communication channels are available, that is, in systems such as the OS/2 operating system, many instances of a channel with the same name are allowed to exist simultaneously. Thus, as used by the invention, each application wishing to receive type X messages would each create an instance of a channel of name X. A sending process wishing to send a message to all processes in the system wishing to see such a message merely opens all instances of a communication channel in the system which have the same name corresponding to the message type to be sent.

Thus, it can be seen that a selective message distribution function or service can easily be incorporated into a system using channels like named pipes, and without the requirement of providing a registry. The message distribution can be performed by processes that know only the type identification of a message to be sent and can be received by all processes wishing to receive messages of the specified type. The sending processes do not have to be aware of the processes that are receiving messages. The sending processes merely open system channels named for the message type to be sent and write the message to the channels. Similarly, the message receiving processes do not have to be aware of the processes sending the messages.

DETAILED DESCRIPTION

A named pipe is a communication facility in a multitasking computer operating system which can be used to send and receive data and messages between executing processes in the system, or even between processes in different systems in some present and planned extensions of named pipes. Named pipes are now common in the art. The following are characteristics of such named pipes. A pipe is established by system functions on demand by a process. It is owned by the creating process and one end of the pipe terminates on the creating process. Typically, the creator and owner of a named pipe is a sender of data, etc. to a second process at the other end of the pipe. However, a pipe owner may also receive from a pipe. In fact, this mode of operation is used, as will be described, to advantage by the present invention. A pipe may also be created for duplex operation. That is, a pipe can be used to send data in both directions along the pipe between processes. Each pipe a name by which is addressed (some systems translate a name into a handle, a number by which the device is addressed). Multiple instances of a named pipe are allowed and are addressable by the interested processes.

Another form of IPC called semaphores are typically used to synchronize data sending and receiving operations on a pipe so that a sender will not overflow the pipe and a receiver will know when to read data from the pipe. These semaphores are also typically used to guarantee atomic write/read operations to the pipe.

The process owning a pipe can terminate the pipe at any time. If a process itself terminates, all named pipes owned by the process are also terminated. In other words, any named pipe will not outlast its creator. These operations on named pipes, creating, sending and receiving data, and termination are performed by system functions on demand of the other processes. For example, the OS/2 operating system provides for the manipulation of named pipes via a set of system calls, which include the following:

DosCallNmPipe—performs a complete set of operations to write to a named pipe. This includes open, write, and close of the named pipe.

DosClose—closes a file, device pipe.

DosConnectNmPipe—connects an application with a named pipe and allows the application read from and write to the pipe.

DosDisConnectNmPipe—disconnects and application from a named pipe after an application is done reading or writing.

DosMadeNmPipe—creates a named pipe using a name supplied by the application and returns a handle by which the application can be addressed to perform named pipe functions such as read, write, open, and close.

DosOpen—opens a file or named pipe.

DosPeekNmPipe—allows an application to look at the data arriving through a named pipe without removing the data from the pipe.

DosQNmPHandState—allows an application to query the characteristics of a pipe (e.g., message type vs. a block type)

DosQNmPipeInfo—allows an application to query statistics about a named pipe (e.g., current number of instances, max. number of instances allowed).

DosQNmPipeSemState—allows an application to query the state of the pipe (e.g., data in pipe, amount of data in pipe).

DosRead—reads from a file or named pipe.

DosReadAsync—allows an application to transfer asynchronously a specified amount of data from a pipe or file to a buffer.

DosSetNmPHandState—sets the read and blocking modes of a named pipe. (Blocking refers to the stopping of an application until data has arrived in the pipe if no data is available in the pipe when the call was made.)

DosSetNmPipeSem—attaches a system semaphore to a named pipe. The semaphore is then used by an application as an indicator of when data arrives in the pipe.

DosWaitNmPipe—allows an application to wait on the availability of a named pipe creation.

DosWrite—writes to a file or named pipe.

DosWriteAsync—allows an application to transfer asynchronously a specified amount of data from a buffer to a pipe or file.

These functions and their use are generally known by those skilled in the programming art. In particular, they are described in detail in OS/2 Programmers Reference Guide, Document Number 64F0275, September 1989.

Figure 1:
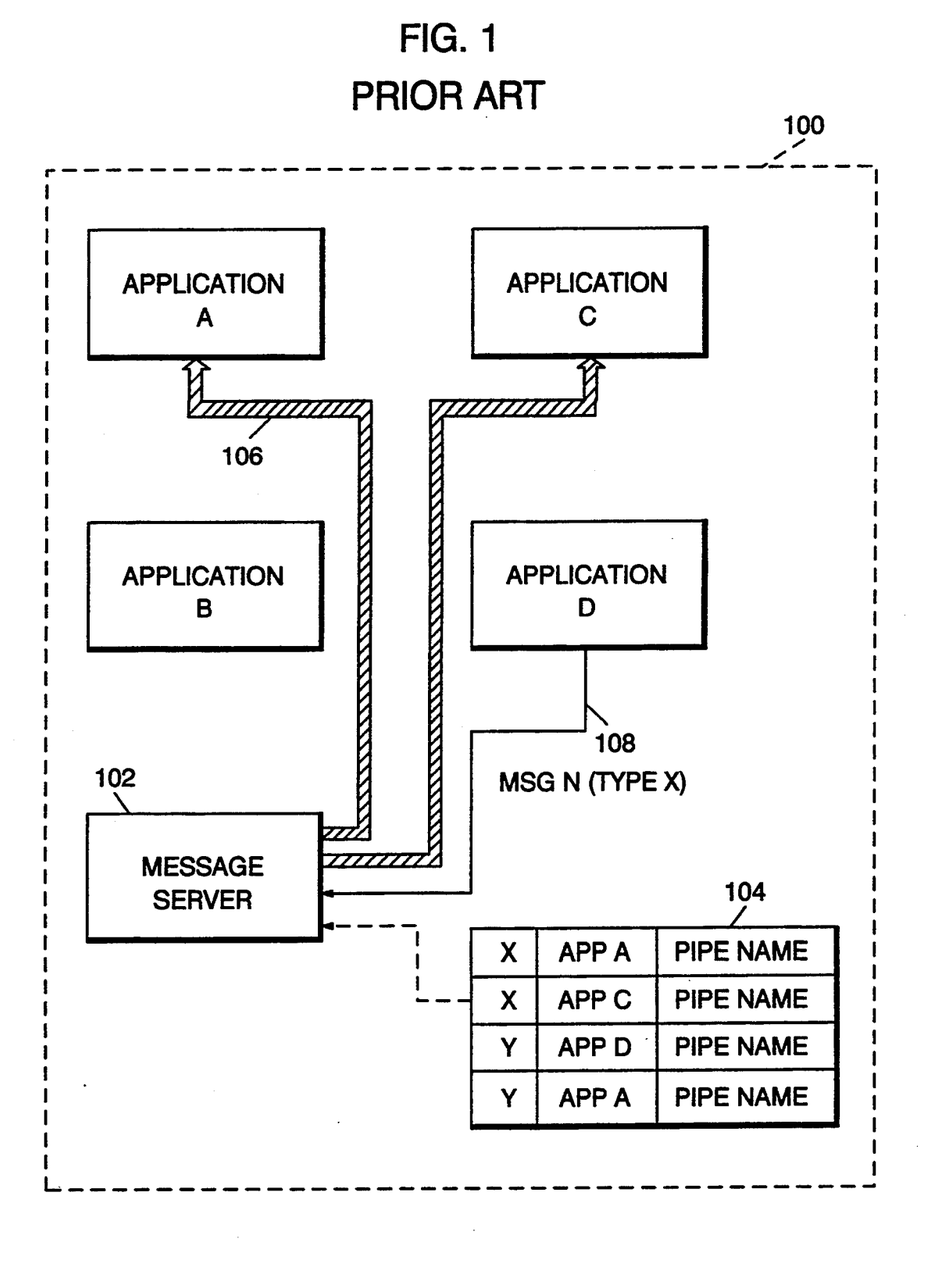
FIG. 1 shows a block diagram of a prior art message distribution system using a registry approach.

FIG. 1 shows an example of the way named pipes are typically used in the prior art to perform message communication between processes. This is a simplified example, involving a single multitasking computer 100. In the example, it is assumed that at least four separate application processes A through D are executing within the system at the time of interest. Also shown is a message server 102 and a registration table 104. If application program A, wishes to receive messages of a certain class or type generated by the system or by other applications, it registers itself with the message server 102 by means of a suitable system call. The registration request includes an indication from the registering process of the type of message that it is interested in receiving. We will assume that application A requests to see all messages of type X received by the message server. Similarly, at some point in time, application C has also requested to receive messages of type X from the server 102. Application D has requested to receive message of type Y. When the system function provided for registering is executed, the result is the inclusion of the requesting process in the registration table 104. In accordance with this specific example, it is seen that table 104 includes separate entries for applications A, C and D, along with an indication for each of the type of message each application wishes to receive.

When a registration request is received by the server 102, besides making an appropriate entry in the registration table 104, a named pipe extending from the server to the application is also created. As shown, the specific pipe name for a given requestor and message type is entered into the registration table 104. For example, when application A requests to be registered for receiving type X messages, a pipe 106 is created from the server 102 to application A (if a pipe did not already exist to application A). The identification of these pipes is arbitrary and has no relationship to types of message to be sent over them or to the receiving processes, other than via the registration table 104. Pipes or other communication channels such as 108 may also be created from applications to the server for the purpose of sending messages to the server for distribution. The specific details of the communication from applications to the server 102 are ignored for this simplified example.

Assume now that application D in FIG. 1 generates a message of type X for distribution to all other system processes that wish to receive type X messages. This message is sent to the server 102 by means of the channel or pipe 108. Server 102 receives the message, notes its type which is included in the message, and searches the registration table 104 for an identification of all registered processes that wish to receive type X messages. In this example, the server finds applications A and C registered for message type X. Accordingly, the server 102 acquires the pipe identifications from the table 104 associated with applications A and C and routes the received message from application D to A and C via those pipes. In the case of application A, the message is routed via pipe 106, which is identified in the PIPENAME field of registration table 104.

As was briefly mentioned earlier, this typical type of messaging arrangement is associated with certain disadvantages. Foremost is the fact that the registration table 104 must be administered. Secondly, this administration is not necessarily automatic. For example, suppose that application A disappears from the system for any reason. It could be from a system malfunction, program bug, or any number of other causes. In such a case, the table 104 is not automatically updated and the registration of A remains in the table. Any erroneous table entries will eventually be removed by the system when server 102 attempts to communicate with the application identified by a table entry. However, the table will only be restored to a correct state after the handling of one or more error conditions resulting from a communication.

Figure 2:
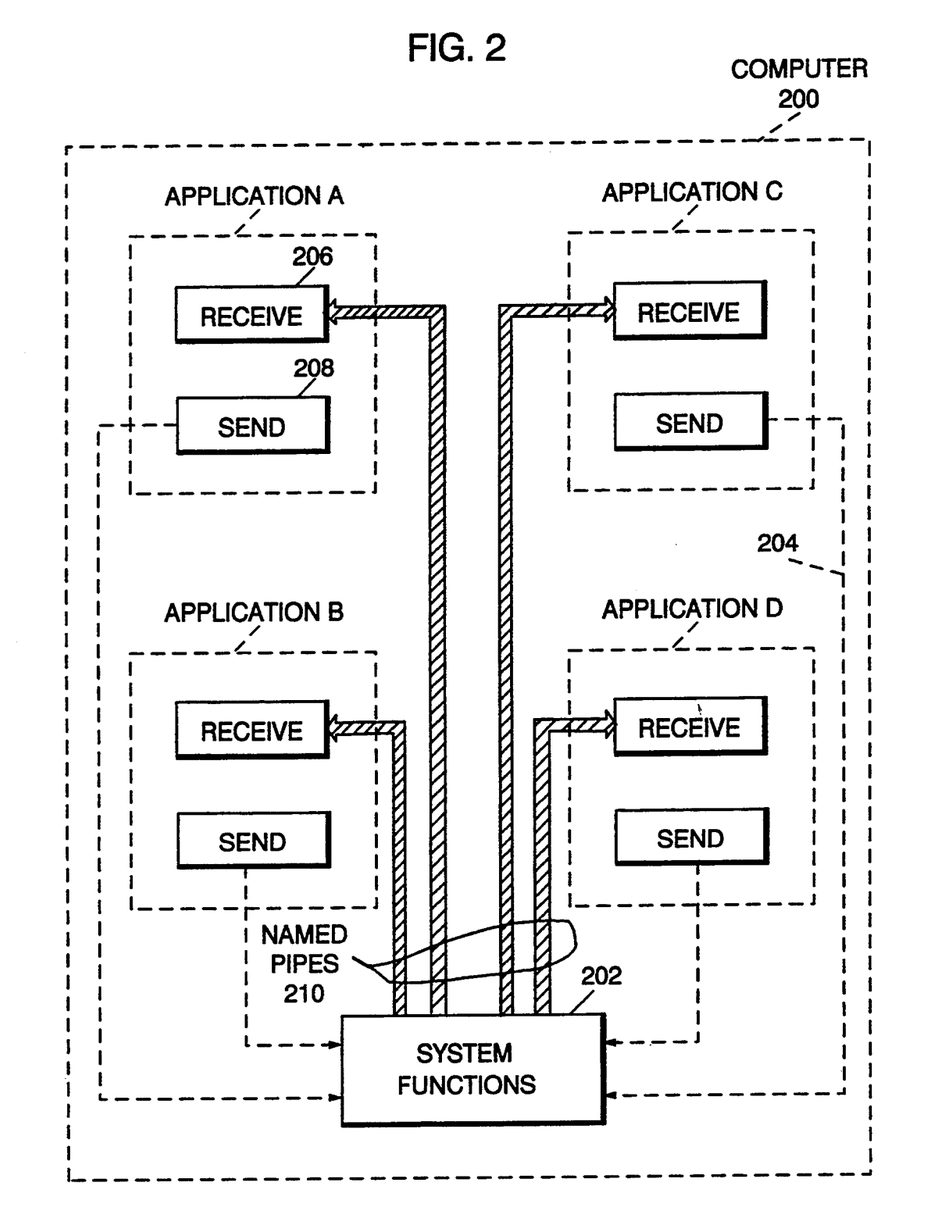
FIG. 2 shows a block diagram of a system using named communication channels according to the invention.
Figure 6:
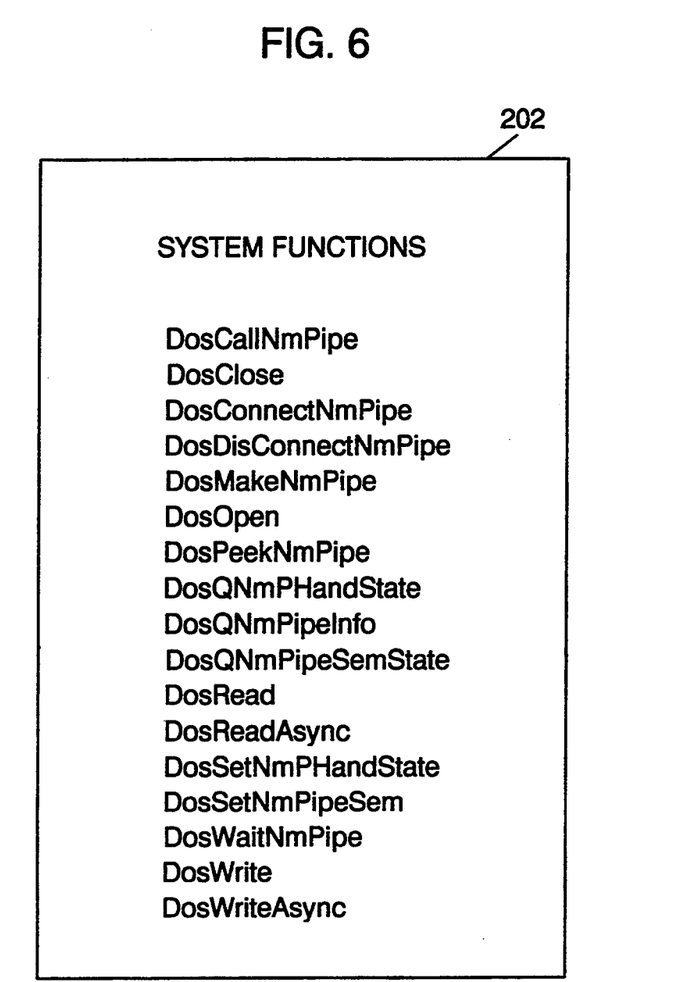
FIG. 6 shows the systems functions.

FIG. 2 shows an example of similar message communication in a system designed in accordance with the invention. In this illustrative example, there is no explicit message server. Such an example will be briefly described later in the discussion. Again, it is assumed for the example of FIG. 2 that four applications A through D are active in the system 200. The system functions that are provided for manipulating pipes are conceptually shown as a single box 202. System functions 202 are named in FIG. 6; the named functions are defined hereinabove. Dashed lines in the Figure are intended to represent calls to the system functions by the applications. Each application includes a RECEIVE module and a SEND module, such as 206 and 208 associated with application A. When an application wishes to receive messages of a given type from other applications, the RECEIVE module of the application creates a named pipe that terminates at one end on the RECEIVE module of the creating application. The named pipes 210 shown terminating on the RECEIVE modules of applications A through D are examples of this. In accordance with the invention, each pipe is given a name that identifies a message type to be sent via the pipe. Therefore, for example, if an application, say A, wished to receive two message types, X and Y, its RECEIVE module would invoke an instance of each of two pipes terminating at the RECEIVE module, one for each type of message and each named by the system functions to identify the message type with which it is associated. Because the applications create the named pipes, they own them, rather than in the typical situation of FIG. 1, in which the pipes are owned by the server 102. One advantage of this arrangement is that if an application terminates for any reason, the system functions automatically terminate the pipe. For example, the OS/2 operating system uses the DosClose function to close all file and pipe handles owned by a process during normal or abnormal termination of the process. As will also become apparent, this arrangement eliminates the need for a registry.

As shown in FIG. 2, each named pipe terminates at its other end at the box labeled SYSTEM FUNCTIONS. This termination is conceptual in nature. Actually, each of these pipes are merely present in the system and identified to the operating system by a consistent naming convention that associates each instance of a pipe with a particular type of message. And via this naming convention, processes such as A through D are able to access pipes and instances of pipes via system functions for the sending of messages.

When an application wishes to send a message of a certain type to all other applications wishing to see this type of message, the sending application makes an appropriate system call, using the message type as the pipe name. The system call locates each instance of a pipe of the name corresponding to the message type and sends the message down the pipe to the appropriate RECEIVE module. The dashed lines in FIG. 2 represent the communication processes by which a SEND module of an application performs a system call to send such a message to other interested recipient processes.

Figure 3:
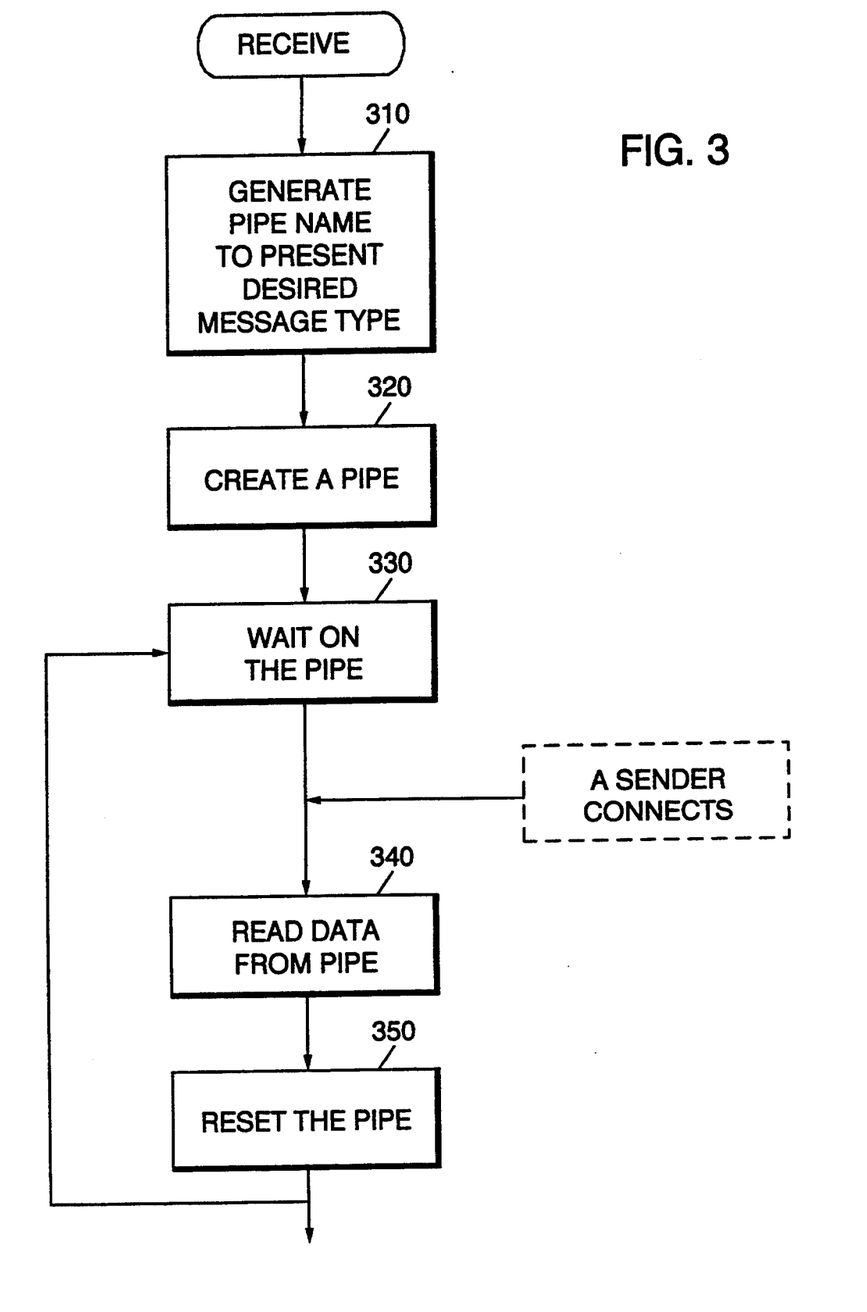
FIGS. 3 and 4 show flowcharts of a message receiving module and a message sending module, respectively. Illustrative code for the receiving and sending modules is shown in appendices A and B, respectively.
Figure 4:
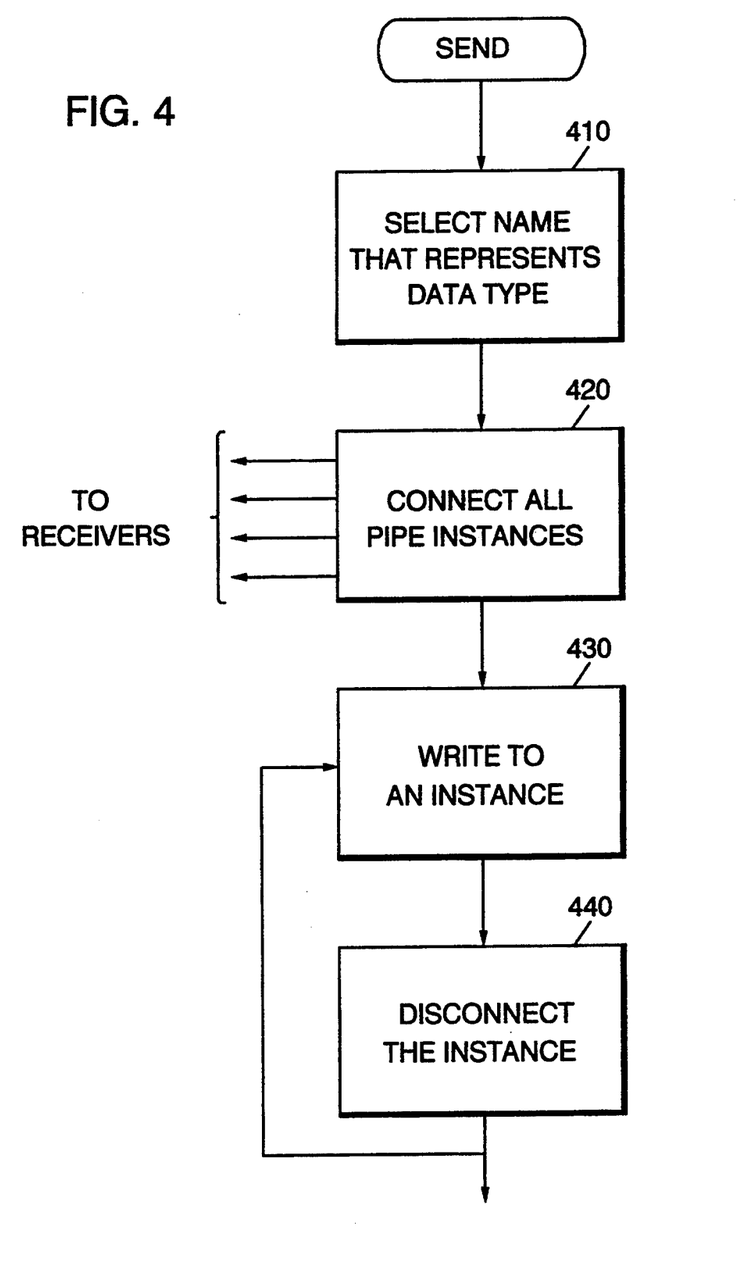

The essential steps performed by the RECEIVE and SEND modules of each application are shown in FIGS. 3 and 4, respectively. Illustrative source code corresponding to these steps are shown in Appendices A and B, respectively.

With reference to FIG. 3 and Appendix A, a RECEIVE module will now be described. This module is executed when an application wishes to establish itself for receiving messages of a specified type. Step 310 generates the pipe name in accordance with the type of message that the application wishes to receive. There are various ways of accomplishing the pipe name generation. This is a trivial function and no great detail is required to explain its operation. The only requirement is that for a given type of message, the same pipe name is generated by all interested applications. In the preferred embodiment, the name generating code is included in a source library. This library is included in the RECEIVE module source code of each application and compiled into the module. In Appendix A, this library code is called PIPENAME.C and is included in the RECEIVE module at line 8. The main part of RECEIVE begins at line 10. The system function call Dos- MakeNmPipe at line 13 actually creates the pipe that is owned by and terminates on the creating application. This corresponds to step 320 in FIG. 3. DosMakeNmPipe calls another function "build_pipe_name" to generate the name of the pipe. Recall that the pipe name is predetermined based on the type of message for which the pipe is created. The function DosMakeNmPipe has a number of parameters. The first parameter identifies "build_pipe_name(X)", which is included in the library source program PIPENAME.C. As mentioned, this function generates the pipe name for DosMakeNmPipe. This corresponds to step 310 of FIG. 3. DosMakeNmPipe creates the pipe and returns a handle in pipe_handle, by means of which the pipe may be addressed via other system function calls. X, the argument to the DosMakeNmPipe function, represents the message type for which the pipe is being created. The success or failure of the pipe creation in line 14 is returned by DosMakeNmPipe in the return code variable rc at line 14. It should be noted that this illustrative example creates the pipe in "blocking" mode. This means that the operating system suspends operations of the process executing the DosConnectNmPipe function call (sometimes called a sleeping process) until a message is present on the pipe. At that time the operating system resumes operation of the suspended process (reawakens the process) so that it begins at line 16 of Appendix A to read the message. If the pipe had been created in non-blocking mode, the RECEIVE process would have to administer the pipe operations itself with, for example, the use of the DosSetNmPipeSem function call.

An alternative method of creating consistent pipe names that reflect the message type to be associated with a pipe is to provide a system function call for that purpose.

After the pipe is successfully created, as indicated by rc being set equal to NO_ERROR, the RECEIVE module waits on the pipe to receive messages corresponding to the name of the pipe. This corresponds to "sleeping" in the illustrative example. This occurs at step 330 of FIG. 3 and line 14 of Appendix A. If the application wishes to receive other types of messages, RECEIVE must create pipes for these types of messages and wait on them also. If a message is sent, the waiting application will be awakened by the operating system to receive the message, without otherwise consuming system resources by looping and checking or by other means. In this preferred embodiment, the RECEIVE module uses the system function call DosConnectNmPipe. The function prepares the pipe to accept a DosOpen system call from a message sender. Until another application performs a DosOpen function for a specified message type, the RECEIVE module effectively remains asleep.

When a message sender connects to a named pipe (performs a DosOpen system function for a specified pipe name), then the sender is effectively connected to the pipe. Actually, the sender is effectively connected to every instance of a named pipe of the same name. The sending application sends the message it wishes to communicate by means of another system call, to be discussed with reference to the SEND module. Every RECEIVE module connected to a pipe instance for the correct message type receives the message from its pipe. This occurs at 340 of FIG. 3 and at line 16 of Appendix A. The system function DosRead at line 19 of Appendix A actually performs the message read from the pipe. The message is read into the parameter "buffer" specified within the function. The actual write into "buffer" occurs at line 25. The read and write of message bytes from the pipe continues until the parameter "bytes_read" at line 21 indicates no more bytes are forthcoming. This signals the end of the message. At this point, the pipe must be reset to prepare it for another subsequent message. This occurs at step 350 of FIG. 3 and line 22 of Appendix A. The system function call DosDisConnectNmPipe at line 22 performs this operation. After the pipe is reset, the RECEIVE module returns to waiting on the pipe at step 330 for the receipt of the next message.

The module RECEIVE also activates an appropriate function after a message has been read and stored in the buffer so that the message may be acted upon. This function is not shown, as it is not particularly relevant to the invention.

An application SEND module is illustrated in FIG. 4 and in Appendix B. When a SEND module executes to send a message of type X to all other interested applications, it generates the pipe name corresponding to the message type in a manner similar to that already discussed with respect to the RECEIVE module. This occurs at step 410 of FIG. 4 and line 15 of Appendix B. Then, beginning at line 16 (and at step 420), SEND loops to connect to all instances of named pipes in the system whose names correspond to the message type. The next instance of a pipe name is opened by the system function on each loop. When there are no more pipe instances, the operating system informs the SEND module with a return code. The actual connect to each named pipe is performed by the system function call DosOpen at line 18. The loop for performing the message write to each pipe occurs at line 21 of Appendix B. The actual write of the message to a pipe occurs via the DosWrite system call at line 24 (step 430 of FIG. 4). On each loop, the DosWrite function automatically writes to the next instance of the named pipe. After each write to a pipe, the DosClose system function call at line 25 (step 440) disconnects the sending application from the pipe and causes the DosRead function call at line 18 of the RECEIVE module of the application connected to the pipe to receive a zero byte indication in its parameter bytes_read. The pipe disconnection (close) by SEND indicates the end of a "send" operation to that pipe instance. The loop at steps 430 and 440 of FIG. 4 repeats to write the message to all instances of the named pipe. Thereafter, this particular execution of the SEND module is complete and the SEND module terminates it operation until the application wishes to send another message.

With the above method, a message sending application does not need to know which applications wish to receive a particular message. Neither does a receiving application need to know which application is sending a message. And, importantly, messages are transported system wide in a flexible and powerful manner, with substantially reduced system overhead required for accomplishing the objective. The consistent pipe naming convention allows receiving applications to identify types of messages it wishes to receive and it allows sending applications to communicate with all other applications wishing messages of specified types, without having to otherwise identify the applications or to register them. The message read/write operations to named pipes are automatically atomic ones. That is, once two pipe ends are connected for sending a message, the write/read operations over the pipe cannot be interrupted by any other sending application until the pipe is disconnected. This is an automatic feature of using system function calls to administer the actual transfer of the message.

Figure 5:
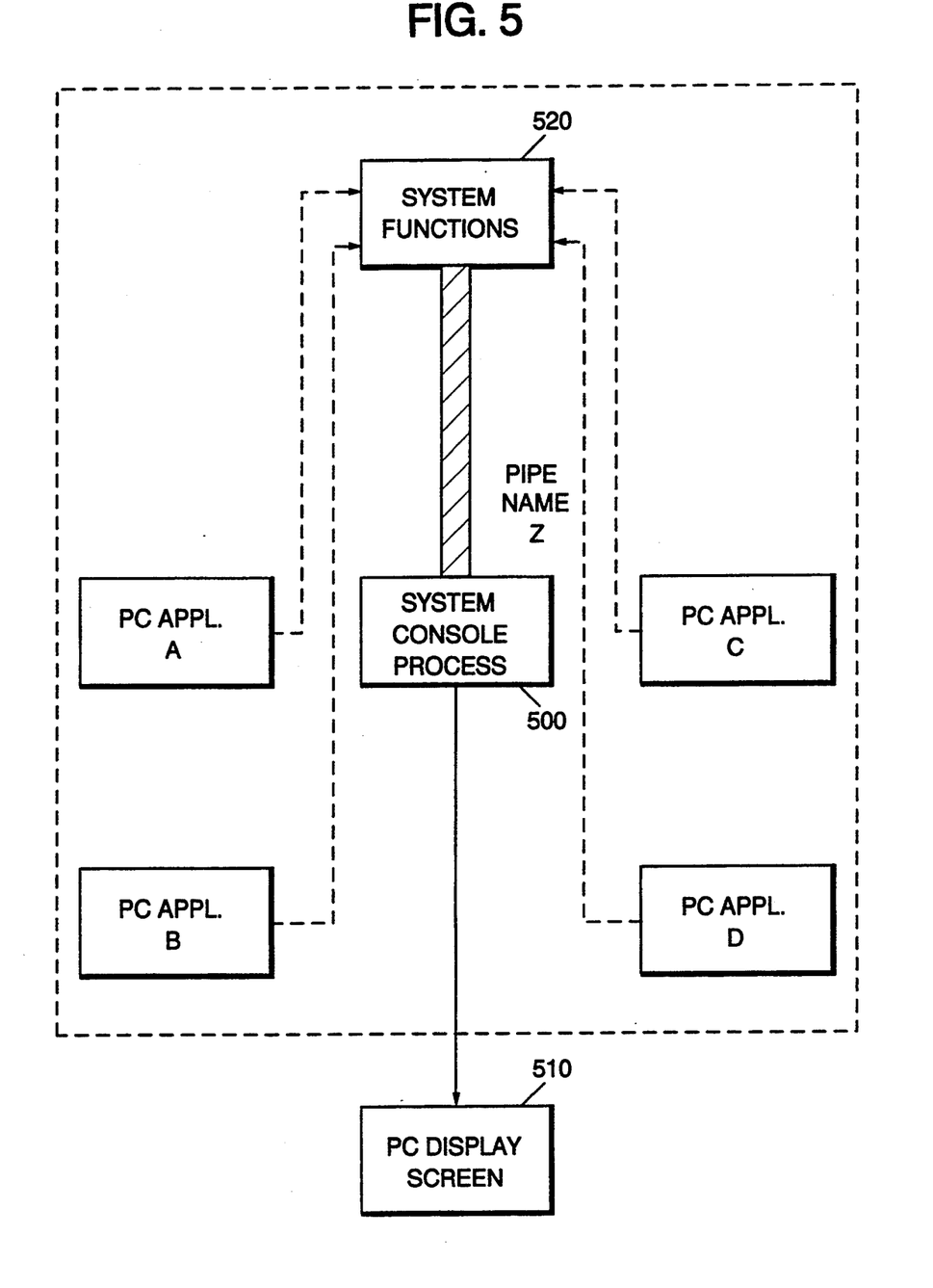
FIG. 5 shows an example of a message distribution service according to the invention.

FIG. 5 shows one specific example of the use of the invention. This example involves the use of a single desktop computer process to provide a messaging service for other processes running on the desktop computer. For example, this service could be used to forward operational messages from background processes for logging and screen presentation to a user of the computer. The message service provides the user with a consolidated presentation of messages of a selected type for processes that do not have access to the computer display screen. For example, this illustrative messaging service can be used to provide a solution to the problem of detached software processes in the OS/2 (trademark of IBM) operating system. Detached processes cannot at the present time perform screen output without interrupting the operation of the computer. By definition, detached processes do not have a "screen" or a "keyboard" defined for user input and operations. This lowers system overhead. However, it creates the problem that detached processes cannot communicate with the user, even when unusual conditions demand it, without seizing control of the screen and thereby seriously interfering with the screen communication of other applications. This message service allows such detached processes to display screen messages to the user, without such interference. The message console 500 merely overlays a window onto the screen and displays the message in a nonintrusive manner.

In more detail, the purpose of system console 500 is to receive messages of a designated type, say type Z, from other processes A through D operating in the computer and display them in an intelligent and nonintrusive manner on the display screen 510. For example, it might be assumed that the system console process 500 is designed to display received messages in the order in which it receives them and to display them only in a screen window that is nonintrusive to other information that is simultaneously displayed on the screen. When the computer is turned on, the system console process 500 is loaded as a background process in the computer. One of its first operations is to create a pipe named Z. Note that the pipe name Z corresponds to the message type it wishes to receive. One end of the pipe terminates on the console process 500. The other end conceptually terminates on the box 520 labeled system functions, as in FIG. 2. By design, all processes A–D in the system know that if they wish to display error, logging and general information messages to the user, they may do so via message type Z. Therefore, when such an event occurs within a process, even a detached process, the process merely generates the desired message as a type Z, makes the appropriate system call to named pipe Z and sends the message on the pipe. As a result, the system console process 500 receives the message and takes appropriate action to create a display window on screen 510. The console process 500 can then display the message in the window, alert the user via a tone, if desired, and remove the window on demand from the user, all while administering this process for all messages of type Z that process 500 might receive from any process, known or otherwise.

It is to be understood that the above described arrangements are merely illustrative of the application of principles of the invention and that other arrangements may be devised by workers skilled in the art without departing from the spirit and scope of the invention.

APPENDIX A

```
/******************************************************************/
/*                                                                */
/*                     RECEIVE.C                                  */
/*                                                                */
/******************************************************************/
```

1) #define INCL_DOS

2) #define INCL_DOSNMPIPES

3) #define INCL_DOSERRORS

4) #include <os2.h>

5) #include <stdio.h>

6) #define PIPE_SIZE 1024

7) #define MAX_PIPE_INSTANCES 5

8) #define X 3

9) #include "pipename.c"

10) int main ( void )

{

11) USHORT rc;

12) HPIPE pipe_handle;

/*          CREATE A NAMED PIPE                    */

13)   rc = DosMakeNmPipe (      /* Create an instance of the pipe  */ build_pipe_name ( X ), /* Get pipe name for data type X.   */

&pipe_handle,         /* returned pipe handle              */

0U,                   /* OpenMode: Inbound (client to server)*/

/* child may inherit                 */
      MAX_PIPE_INSTANCES,   /* Open in blocking mode             */

0U,                   /* Advisory outgoing buffer size     */

PIPE_SIZE,            /* Advisory incoming buffer size     */

0x5000ul );           /* Default Timeout for DosWaitNmPipe */

/*          WAIT ON THE PIPE FOR A MESSAGE         */

14)   while ( rc == NO_ERROR )

{

15)      rc = DosConnectNmPipe ( pipe_handle );

/* Prepare the pipe to accept       */

/* a DosOpen from a sender.         */

/* OS/2 will block this operation until*/

/* a sender DosOpen this pipe instance.*/

/*          RECEIVED MESSAGE - READ IT             */

16)   while ( rc == NO_ERROR )

{                    /* Keep reading from the sender

```
*/
                          /* until all data has been read    */
17)    USHORT bytes_read;
18)    static BYTE buffer [ PIPE_SIZE ];
19)    rc = DosRead ( pipe_handle,
              buffer,
              sizeof buffer,
              &bytes_read );
                          /* Read data from the pipe.        */

20)    if ( rc == NO_ERROR )
       {
21)        if ( bytes_read == 0 ) /* No more data from that sender */
           {
/*                RESET PIPE                          */
22)            rc = DosDisConnectNmPipe ( pipe_handle );
23)            break;        /* Disconnect the current sender. */
           }
24)        else              /* Display the received data. */
           {
25)            write ( 1, buffer, bytes_read );  /* Write to the standard output device # 1. */
           }
       } /* if */
    } /* while */
  } /* while */
  return 0;
} /* main */
/* ----------------------- end of file ---------------------- */
```

APPENDIX B

```
/*******************************************************************/
/*                                                                 */
/*                        SEND.C                                   */
/*                                                                 */
/*******************************************************************/
```

1) #define INCL_DOS

2) #define INCL_DOSNMPIPES

3) #define INCL_DOSERRORS

4) #include <os2.h>

5) #include <stdio.h>

6) #define PIPE_SIZE 1024

7) #define MAX_PIPE_INSTANCES 5

8) #define X 3

9) #include "pipename.c"

10) int main ( void )
    {

11) HPIPE pipe_handle [ MAX_PIPE_INSTANCES ];

12) USHORT rc;

13) PSZ pipename;

14) int i, number_of_instances = 0;

/*                GET PIPENAME                        */

15) pipename = build_pipe_name(X); /* Get pipe name for data type X. */

/*        CONNECT ALL INSTANCES OF THIS PIPENAME      */

/* Loop to connect all available */
   /* pipe instances.               */

16) for ( i = 0 ; i < MAX_PIPE_INSTANCES ; ++i) {

17)    USHORT action_taken;

18)    rc = DosOpen (            /* Connect a pipe instance */ pipename,

&(pipe_handle[number_of_instances]),

&action_taken,

0UL,           /* File size                */
       1U,            /* File attribute           */
       1U,            /* Open flag: open pipe if it exists,*/
                      /* Fail if it does not exist */
       0x0041U,       /* Child can inherit, Deny none, */
                      /* Write-only access        */
       0UL            /* Reserved ULONG           */
       );

19)    if ( rc == NO_ERROR ) {

++number_of_instances;

}

} /* for */

20)    printf ( "Number of instances = %u\n", number_of_instances );

/*     WRITE MESSAGE TO EACH INSTANCE OF THIS PIPENAME    */

21)    for ( i = 0 ; i < number_of_instances; ++i) {

/* For each pipe instance:   */

/* write and then disconnect. */

22)    USHORT bytes_written;

23)    static BYTE data [] = "Test Data";

24)    DosWrite ( pipe_handle [i], data, sizeof data, &bytes_written );

/*     DISCONNECT THIS INSTANCE OF THE PIPENAME    */

25)    DosClose ( pipe_handle [i] );

/* disconnect the pipe instance. */

```
}   /* for */

26)   return 0;

}   /* main */

/* ---------------------- end of file ----------------------
-- */
```

We claim:

1. A method of communicating messages between message sending and message receiving processes in a computer system having an operating system, comprising the steps of:

generating, for each receiving process, a communication channel name that corresponds with a message type of messages the receiving process wishes to receive;

creating, for each receiving process, a communication channel terminating at one end on the receiving process having the generated communication channel name, selectably connectable to each sending process and administered by the operating system of the computer system;

repeating said generating and creating steps for each message type desired to be received by each receiving process;

generating, by a sending process a send communication channel name that corresponds with a message type of a message to be sent by the sending process;

opening, by the sending process a connection to all communication channels created in the computer system having the send communication channel name;

writing the message to each opened communication channel by the sending process, with each receiving process at the terminating end of each opened communication channel reading the message from the opened communication channel; and wherein the steps of creating, opening, writing, and reading of the channel are performed by the operating system in response to system function calls by the processes and wherein for a given message type each process in the computer system generates a communication channel name that is unique.

2. The method of claim 1 further comprising the steps of placing each receiving process in an inactive state awaiting a message following the step of creating the communication channel.

3. The method of claim 2 wherein the step of placing each receiving process in the inactive state further comprises the step, executed by the operating system in response to a system function call by the receiving process, of preparing the operating system to accept a channel open function call for the inactive receiving process from a sending process.

4. The method of claim 2 or claim 3 wherein the inactive state is a process suspended state.

5. The method of claim 2 or claim 3 further comprising the step of alerting the receiving process by means of system semaphores in response to writing the message to the communication channel.

6. The method of claim 4 further comprising the step of reactivating the suspended receiving process in response to the writing of a message via the channel.

7. The method of claim 6 wherein the step of reactivating the receiving process is reactivated in response to a channel open function call by the sending process executed by the operating system.

8. The method of claim 5 wherein the step of reading from the channel by the receiving process after being alerted further comprises reading message information blocks from the channel, each in response to a system function call, until an empty block is received.

9. The method of claim 7 wherein the step of reading from the channel by the receiving process after being reactivated further comprises reading message information blocks from the channel, each in response to a system function call, until an empty block is received.

10. The method of claim 7 further comprising placing the receiving process into an inactive state again in response to receipt of the empty block.

11. The method of claim 1 further comprising the step of disconnecting the sending process from each opened communication channel after the message has been written to the channel by executing a channel disconnect system function call.

12. Apparatus in a computer system for communicating messages between message sending modules and message receiving modules, said computer system having an operating system and a plurality of application units running on the operating system, said apparatus comprising:

each of said plurality of application units having a message sending module and a message receiving module, system means for administering communication channels between modules in the system by means of system function calls issued by the modules, said system means including means for creating communication channels, means for naming the communication channels, means for opening a channel for the sending of messages on the channel, and means for preparing a channel to be opened for receiving messages sent on an opened channel, means in a receiving module for activating the creating means in the system means to create a communication channel terminating at one end on the receiving module, means in the receiving module for activating the naming means to assign a system name to the channel in correspondence with a message type desired to be received by the receiving process via the channel, means in the receiving module for activating the preparing means to prepare a channel to be opened for receiving messages, means in a sending module for activating the naming means to assign a system name to the channel in correspondence with a message type desired to be sent, means in the sending module for activating the opening means for opening a prepared channel having a name assigned by the naming means, means in the sending module for writing the message to the opened channel, means in the receiving module for reading the message from the opened channel, and wherein the naming means assigns system names so that for any given message type the system name is unique.

13. The apparatus of claim 12 wherein the means for opening a channel further comprises means for opening all instances of channels having the unique name corresponding to the message type to be sent.

14. The apparatus of claim 13 wherein the means for writing further comprises means for writing the message to all instances of channels having the unique corresponding to the message type to be sent.

15. The apparatus of claim 12 further comprising means in a receiving module for resetting a channel after the receipt of a message to enable the channel for the sending of another message by a sending module.

16. Message sending apparatus for use in a computer system for communicating messages from a sending process to message receiving processes via named pipes terminating on the receiving processes and administered by the system, comprising:

means controlled by each receiving process for creating a named pipe for each message type to be received by the receiving process each named pipe having a name corresponding to the message type to be received and suspending all actions by the receiving process on the pipe whereby the receiving process is asleep, means for opening every instance of a named pipe having a name corresponding to a message type to be sent by the sending process, means for writing the message to each instance of the named pipe and awakening the receiving process attached to each instance of the named pipe of the message, and means responsive to said awakening means for reading the message from each instance of the named pipe of the message.

17. The apparatus of claim 16 further comprising means for closing each instance of the named pipe after writing the message to that pipe instance.

18. A method of sending messages in a computer system from a sending process to message receiving processes via named pipes terminating on the receiving processes and administered by the system, comprising the steps of:

creating for each receiving process a named pipe for each message type to be received by the receiving process each named pipe having a name corresponding to the message type to be received and suspending all actions by the receiving process on the pipe whereby the receiving process is asleep, opening every instance of a named pipe having a name corresponding to a message type to be sent by the sending process, writing the message to each instance of the named pipe, awakening the receiving process attached to each instance of the named pipe of the message, and reading, after said awakening step, the message from each instance of the named pipe of the message.

19. The method of claim 18 further comprising closing each instance of the named pipe after writing the message to that pipe instance.

20. The method of claim 1 wherein the steps of generating are performed by the operating system in response to system function calls by the processes.

21. A method of communicating messages between a plurality of processes in a computer system having an operating system, a plurality of sending processes, a plurality of receiving processes, each message having an associated message type from a plurality of message types, the method comprising the steps of:

generating a communication channel name for each message type, each receiving process wishes to receive wherein the communication channel name generated corresponds to the message type;

creating a communication channel for each message type, each receiving process wishes to receive having the generated communication channel name and terminating at one end on the receiving process, selectably connectable to each sending process and administered by the operating system of the computer system;

generating, by a sending process a send communication channel name that corresponds with a message type of a message to be sent by the sending process;

opening, by the sending process a connection to all communication channels created in the computer system having the send communication channel name;

writing the message to each opened communication channel by the sending process, with each receiving process at the terminating end of each opened communication channel reading the message from the opened communication channel; and wherein the steps of creating, opening, writing, and reading of the channel are performed by the operating system in response to system function calls by the processes and wherein for a given message type each process in the computer system generates a communication channel name that is unique.

* * * * *